Figure 4:
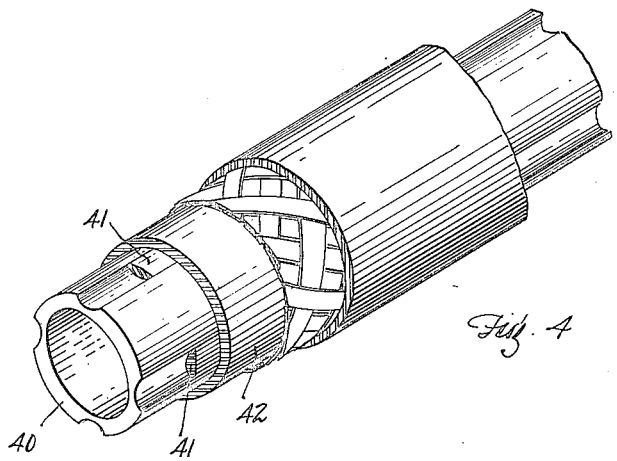

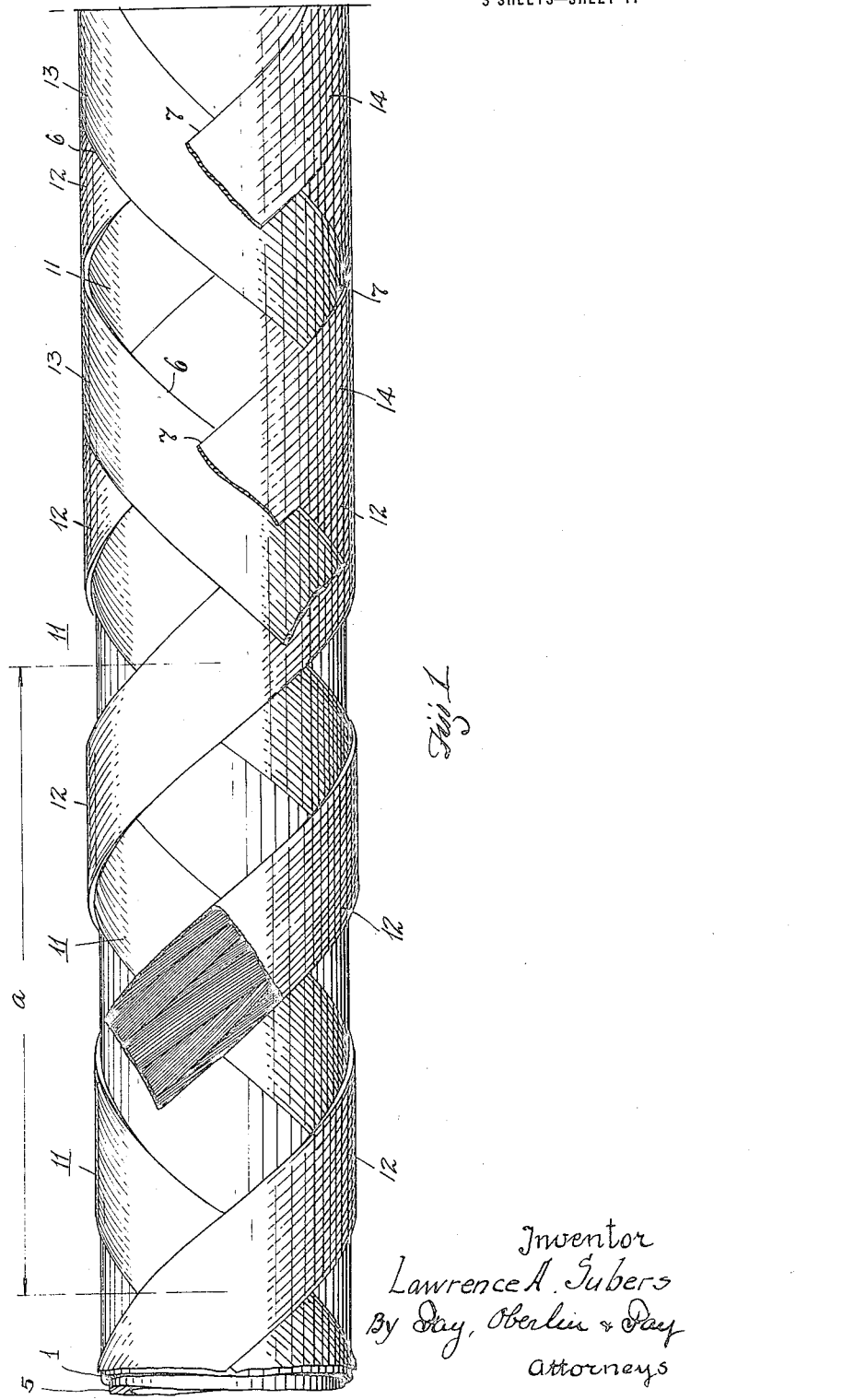

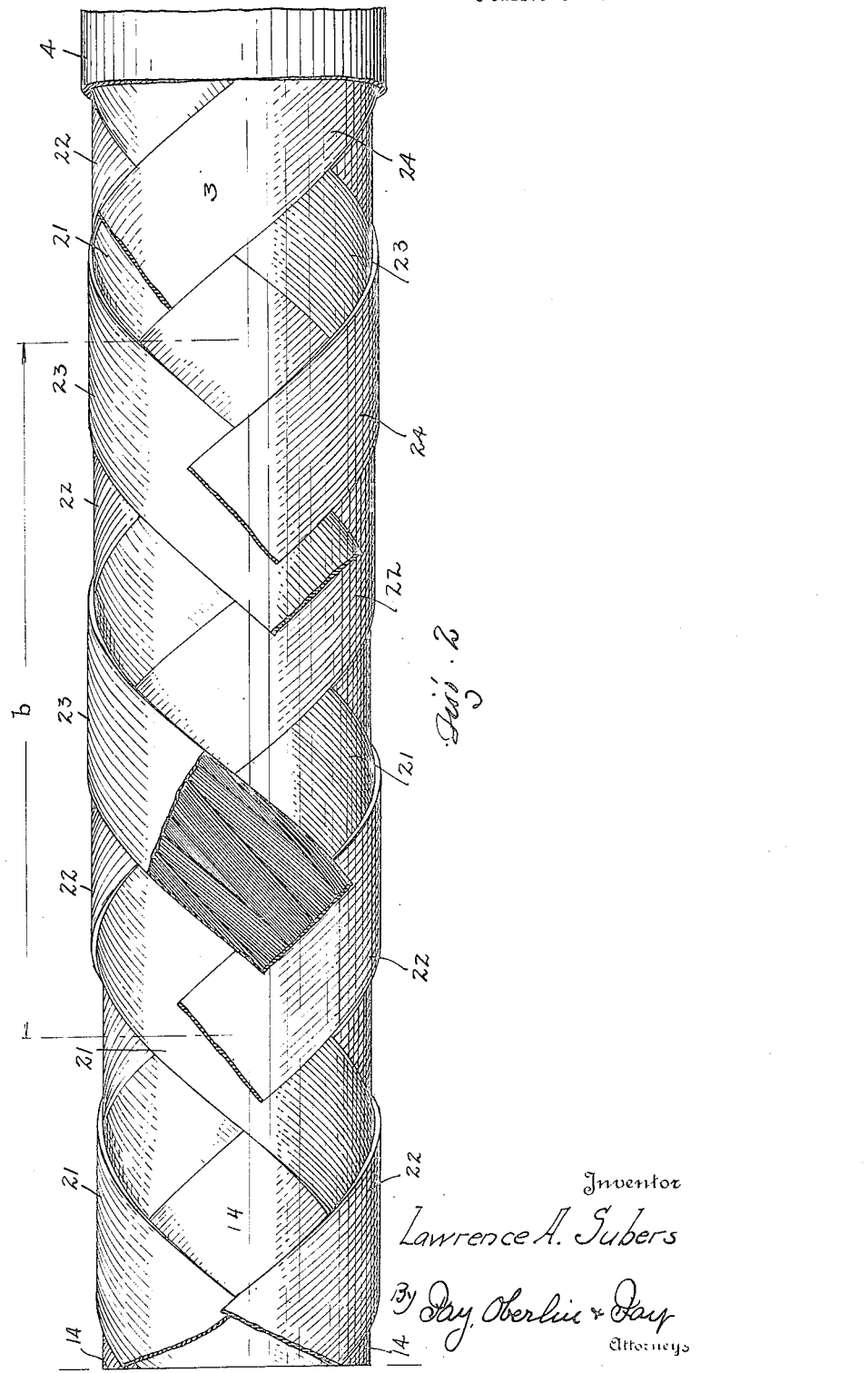

L. A. SUBERS.
HOSE OF PREDETERMINED ACTION UNDER PRESSURE.
APPLICATION FILED JUNE 5, 1920. RENEWED JAN. 10, 1922.

1,425,148.
Patented Aug. 8, 1922.
3 SHEETS—SHEET 3.

Inventor
Lawrence A. Subers.
By Fay Oberlin & Fay
Attorneys.

UNITED STATES PATENT OFFICE.

LAWRENCE A. SUBERS, OF LAKEWOOD, OHIO.

HOSE OF PREDETERMINED ACTION UNDER PRESSURE.

1,425,148.  Specification of Letters Patent.  Patented Aug. 8, 1922.

Application filed June 5, 1920, Serial No. 386,758. Renewed January 10, 1922. Serial No. 528,136.

*To all whom it may concern:*

Be it known that I, LAWRENCE A. SUBERS, a citizen of the United States, and a resident of Lakewood, county of Cuyahoga, and State of Ohio, have invented a new and useful Improvement in Hose of Predetermined Action Under Pressure, of which the following is a specification, the principle of the invention being herein explained and the best mode in which I have contemplated applying that principle, so as to distinguish it from other inventions.

The present invention relates to hose of the general type, having a body or walls of fabric, which gives the strength to resist pressure, and an inner tube or lining and a cover of rubber or other impervious, resilient material, the cover being dispensed with in certain types. Three principal types of hose used at the present time are rubber lined jacket hose, commonly known as circular woven hose; rubber covered hose of duck fabric of right angle weave; and rubber covered hose with a combination of braided and woven fabric.

Such hose as generally constructed, must comply with certain specifications of the Government, the fire commissioners of New York, and the underwriters' laboratories, the specifications being similar. These requirements specify certain definite limits of strength, torsion, expansion, contraction, etc., under pressure, to which a hose must be tested. For instance, the hydraulic pressure tests for two or two and one-half inch (2″ or 2½″) rubber covered fire hose require four hundred pounds pressure, during which test the hose must not leak, sweat or break the threads of the cotton in the layers of fabric. Further the hose must not warp more than twenty inches (20″) from a straight line, elongate more than seven per cent (7%) of the original length, (three and one-half feet in fifty feet), nor twist torsionally more than ten and one-half degrees (10½°) per foot, (nearly one and one-half turns in fifty feet), the twist being in a direction tending to tighten rather than loosen the couplings.

The wide latitude allowed by these specifications as regards bursting pressure, torsion, expansion, contraction, warping, elongation, etc., show the apparent inability by the usual modes of manufacture to control these various conditions within small limits. The unbalanced condition of tension and the difference in strength of warp and woof threads in the duck used for fabrics seems to be one of the principal factors in the results obtained by the usual methods.

More particularly the present invention relates to the construction of the fabric used in the present hose, this fabric being made up of interwound laminated cohesive bands which render it possible in the manufacture of hose to definitely control its action under pressure, practically eliminating the torsional twist, limiting the elongation, expansion and contraction to approximately any desired amount, while also controlling the strength of the hose by the thickness of the fabric used, and distributing the stress or tension practically uniformly throughout the hose.

Another feature of this method of construction is that practically the combined strength of the total number of yarns used in the bands is available in resisting the stresses caused by internal pressure, and while therefore the weight of cotton per foot of hose is no greater than that used in the ordinary construction, an increase of from one-fourth to one-third greater ultimate strength is obtained, thus allowing a greater margin or factor of safety.

Another valuable feature of this method of construction is that, knowing that practically the total strength of all the yarn in the bands is available in resisting rupture, it is possible to calculate, with approximate exactitude, the strength of any desired size of tube or hose, or the thickness of walls necessary in any desired size of tube or hose to withstand any reasonable pressure.

In this method of construction, the width of the bands desired to be used, and the circumference of the tube or mandrel about which they are laid will determine the number of bands per series, each series of bands being adapted to cover one-half of the surface of the mandrel. Thus, for instance, if the tube circumference were doubled, the number of bands per series would necessarily be doubled if the width of the bands were kept the same.

The annexed drawings and the following description set forth in detail one method and one product exemplifying my invention, such disclosed procedure and product constituting, however, but one of various applications of the principles of my invention.

In said annexed drawings:—

Figure 3:
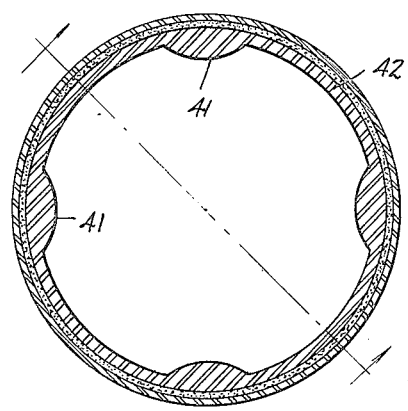
Figure 5:
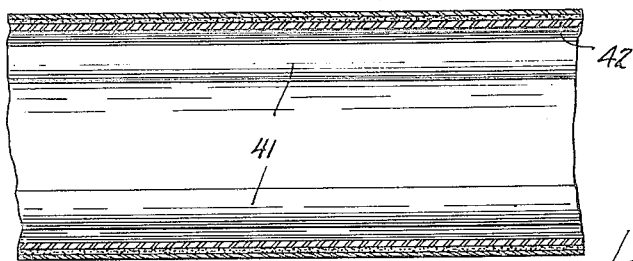

Fig. 1 is a side elevation of a mandrel showing the method of interwinding the bands which comprise the fabric; Fig. 2 is a similar view, being a continuation of Fig. 1, to show the entire construction; Fig. 3 is a transverse section through the finished hose; Fig. 4 is a perspective view partially in section, showing general construction and a specific modification of the interior of the hose; Fig. 5 is a transverse section on the line 5—5 of Fig. 4, and is a longitudinal section on line 6—6 of Fig. 3.

The present hose is shown as being made up of the usual inner rubber tube or lining 1, enclosed by fabric layers 2 and 3 and having an outer cover 4 of rubber or other impervious material although either inner tube or cover or both may be dispensed with in certain types of hose. In making the hose a cylindrical mandrel 5 is employed on which is first placed the rubber lining or tube 1. The fabric is then constructed thereon by winding successive series of fabric bands thereabout, in a predetermined manner as hereinafter described. These fabric bands are preferably of the type formed of a series of threads forming a laminated cohesive interwound band such as shown in my Patent No. 1,017,271, dated February 13, 1912. In the views shown, two layers of this fabric are used, although the number may be varied if desired.

On the cylindrical mandrel 5, a rubber tube or lining 1 is placed, and over and around this tube are wound first two bands 11, under certain tension, spaced 180° circumferentially apart, and of such width that one-half the surface of the tube is covered thereby.

Next, two bands 12 are wound in the opposite direction over and around the bands 11, spaced circumferentially 180° apart, of the same width as bands 11, at an angle of 52° to the longitudinal axis of the hose and at about the same tension as bands 11.

Continuing the process, two bands 13 are wound over and around bands 12, in the same direction and angle as bands 11, and of the same width, being laid over and covering the spaces between the bands 11, these being also spaced 180° circumferentially apart, and at a predetermined increased tension over bands 11 and 12 to give a balanced condition of fabric, and to depress bands 12 at the points 6 of crossing.

In a similar way bands 14 are then wound over and around bands 13 in the same direction and angle as bands 12, and over and covering the spaces between them, thus being spaced 180° circumferentially apart, and completing one layer of fabric consisting of two thicknesses of bands. Bands 14 are also wound at a certain increased tension over bands 11 and 12 to give a balanced condition of fabric, and to depress bands 13 at the crossing points 7.

In winding these bands around the inner tube to construct a layer of fabric at a certain angle as mentioned, the center distance $a$ apart longitudinally of a band after completing one turn around the tube is called the "lead" and the latter term will be so understood in those specifications and claims.

The angle at which these laminated cohesive interwound bands are wound, about 52° to the longitudinal axis of the hose or mandrel, is the result of a large number of experiments, and is the angle at which the minimum amount of both diametrical expansion and longitudinal elongation occur, or in other words the point at which these two conditions are best balanced when a layer of this fabric is under internal pressure. An increase of this angle of winding occasions an increase of elongation, while a decrease in the angle of winding, increases diametrical expansion and decreases the longitudinal elongation. This shows how the action of the hose may be approximately controlled.

Another layer of fabric 3 is next constructed in a similar manner with bands 21, 22, 23, and 24, the angle of winding being practically 52° to the longitudinal axis, but the bands being of increased width over those of the first layer 2, in order to cover the increased surface, due to the increased diameter and leave no openings. Being laid over this increased diameter at the same angle as the bands of the first layer, it is clearly evident that an increased lead $b$ is required. The tension of these bands is also increased over the tension of corresponding bands of the first layer of fabric due to the increased diameter at which they are being interwound. It is also evident that by winding the bands at the same angle, the length of all the bands of the different layers of fabric remains practically equal each to each, per foot of hose, and thus when this hose is subjected to longitudinal stress, with or without internal pressure, the combined strength of all the bands is available for resisting rupture. If additional strength is required more layers of fabric can be used, constructed in a similar manner. When used, the outer cover 4 is applied over the fabric is the usual way.

By actual tests it has been demonstrated that hose constructed by this method and subjected to longitudinal rupture without internal pressure returns to normal size practically immediately thereafter, while if burst under internal pressure, it also returns almost instantly to normal size.

The drawings illustrate the construction of a two inch (2″) rubber covered fire hose, and the following data is that used in the actual construction of such hose:—

*2" hose construction data.*

| | |
|---|---|
| Inside diameter of hose | 2" |
| Outside " " " | 2⅝" |
| Total linear feet of band per layer of fabric | 13 ft. |
| Total linear feet of band per foot of hose | 26 ft. |
| Number of bands in first layer | 8 |
| Total number of bands in both layers | 16 |
| Angle of winding | 52° |
| Thickness of rubber tube or lining | 1/16" |
| " " " " cover | 3/64" |
| Lead for first layer bands | 5.25" |
| " " second " " | 5.89" |
| Width of first layer bands about | 1 1/16" |
| " " second " " " | 1 3/32" |
| Thickness of first and second layer bands about | .052" |
| No. and size of yarns composing each of the bands | 512 yarns size No. 23/1 American cotton. |
| No. of yarns in bands of first layer | 4096 |
| " " " " " " second " | 4096 |
| Total number of yarns in bands | 8192 |
| Width of center strip in band | 1 1/16" |
| Thickness of center strip in band | .015" |
| Material composing center strip in band | rubber, rubber coated threads, or rubber fabric. |

In actual tests of two inch (2") fire hose constructed by this method, of American peeler cotton, the ordinary grade of rubber, with standard thickness of inner lining, outer covering, and fabric, the results obtained in each test, were practically uniform, the following being an example:

At two-hundred pounds (200 lbs.) hydraulic internal pressure:
Diametrical expansion _____ 1/32"
Elongation _____ 0"
No twist or contortion perceptible.

At four-hundred pounds (400 lbs.) hydraulic internal pressure:
Diametrical expansion _____ 3/32"
Elongation _____ 0"
No twist or contortion perceptible.

At six-hundred pounds (600 lbs.) hydraulic internal pressure:
Diametrical expansion ⅛"
Elongation _____ ⅛" per foot.
No twist or contortion perceptible.

In Figs. 3, 4 and 5, a modified hose construction is shown having a mandrel 40, provided with longitudinal grooves in which are laid strips of rubber 41, or other impervious, resilient material, the inner lining or tube 42 being then placed on the mandrel and the hose fabric constructed as previously described, these strips forming continuous, internal, longitudinal ribs.

In this form of hose, the purpose of these ribs 41 is to facilitate the continuously straight passage of liquid through the hose, and obviate the whirling action of the liquid (which is generally recognized as occurring therein). This presumed whirling action increases the friction in the hose, decreasing the efficiency thereof, and these ribs will therefore tend to give greater efficiency to the hose under consideration.

In the construction of the hose as described, a tube or inner lining of rubber is used, the laminated cohesive interwound bands are impregnated or coated with rubber, and rubber covering is also used, thereby causing the hose to become practically one homogeneous and integral structure when vulcanized. It is evident that other similar material to rubber may be used, or that bands of other suitable fabric may be employed, providing proportionately similar results are obtained.

While the data given is for the construction of a two inch (2") fire hose, it is evident that other sizes of hose may be constructed in a similar manner, employing different width of bands, different leads, different number of bands, etc., as the diameter of the hose or tube under construction necessitates.

It is obvious that with modification of application, various articles of manufacture may be produced, such as inner tubes for tire casings, air bags for curing or vulcanizing tire casings, etc., without departing from the spirit of the invention or the scope of the claims.

It is also obvious that the finished product may be collapsed or pressed, or both, before curing or vulcanizing, thereby forming a fabric of selvage edges of predetermined width and thickness, which may be used for belting conveyers, etc. It is also evident that by the incorporation of metallic threads in the fabric band when constructed, these bands when utilized in the construction of a tube or hose would result in a fabric well capable of resisting external as well as internal pressure.

Other forms may be employed embodying the features of my invention instead of the one here explained, change being made in the form or construction, provided the elements stated by any of the following claims or the equivalent of such stated elements be employed, whether produced by my preferred method or by other embodying steps equivalent to those stated in the following claims.

I therefore, particularly point out and distinctly claim as my invention:

1. A hose comprising layers of fabric composed of series of laminated interwound cohesive bands, the bands of the several layers being of practically the same length per unit length of hose.

2. A hose comprising layers of fabric, each layer being composed of an equal number of laminated interwound cohesive bands wound at practically the same angle, successive series of said component bands wound in the opposite direction, the bands of the several layers being of practically the same length per unit of length of hose.

3. A hose comprising an inner lining of rubber and a series of layers of fabric each composed of a series of laminated interwound cohesive bands, the bands of the outer layer being slightly wider than those of the inner layer to maintain the same relative surface covering capacity in both layers, the layers of fabric and the lining being homogeneously united.

4. A hose for the transmission of liquids and the like, comprisng a relatvely smooth walled interior, provided with inner projecting continuous ribs running parallel to the longitudinal axis of the hose.

5. A hose for the transmission of liquids and the like, comprising a relative flexible tube having its interior surface provided with inner projecting continuous ribs running parallel to the longitudinal axis of the tube.

6. A hose for the transmission of liquids and the like, comprising a relatively flexible tube having an interior lining of flexible impervious material provided with inner projecting continuous ribs running parallel to the longitudinal axis of the tube.

7. A hose comprising a plurality of layers of fabric, each layer being composed of a series of laminated cohesive interwound fabric bands wound at a predetermined angle to the longitudinal axis of the hose, successive series being wound in the opposite direction, all bands being of substantially the same length per unit length of hose, the angle of winding being adapted to control the expansion, contraction, and elongation of the hose under pressure.

8. A hose comprising a plurality of layers of fabric homogeneously united together, each layer being composed of a series of laminated interwound cohesive fabric bands wound at a predetermined angle to the longitudinal axis of the hose, successive series being wound in the opposite direction, and under a predetermined tension, all bands being of substantially the same length per unit length of hose, the angle of winding being adapted to control the elongation, expansion and contraction of the hose under pressure, and the tension being adapted to control the torsional twist of the hose under pressure.

9. A hose comprising a plurality of layers of fabric each layer composed of a series of laminated interwound cohesive fabric bands, the bands of each series being of substantially the same length per unit length of hose, and being wound at substantially the same angle to the longitudinal axis of the hose, successive series being wound in the opposite direction, and under different predetermined tension to provide in the finished hose a balanced predetermined resistance to diametrical and longitudinal stresses and to torsional twist under internal pressure.

10. A hose comprising a plurality of layers of fabric each layer composed of a series of laminated interwound cohesive fabric bands of substantially the same width, length and thickness, the bands of each succeeding layer being of increased width but of the same length and being wound under increased tension.

Signed by me this fourth day of June, 1920.

LAWRENCE A. SUBERS.